United States Patent [19]

Geurtsen et al.

[11] 4,214,937

[45] Jul. 29, 1980

[54] APPLICATION OF INDICIA TO ARTICLES

[75] Inventors: Friedrich H. H. Geurtsen, Holliston, Mass.; Waldeman Kebbel, Bremen, Fed. Rep. of Germany

[73] Assignee: Dennison Manufacturing Company, Framingham, Mass.

[21] Appl. No.: 913,775

[22] Filed: Jun. 8, 1978

[51] Int. Cl.[2] ............ B32B 31/00

[52] U.S. Cl. ............ 156/361; 156/495; 156/542; 226/158

[58] Field of Search ........ 156/351, 361, 363, 540–542, 156/494–495; 226/149, 150, 158, 113, 114, 8; 242/182, 183, 185, 187, 189, 190

[56] References Cited

U.S. PATENT DOCUMENTS

| | | | |
|---|---|---|---|
| 3,169,895 | 2/1965 | Sohn | 156/361 |
| 3,175,444 | 3/1965 | Spinney | 226/113 X |
| 3,531,033 | 9/1970 | Parsons | 226/8 |
| 3,554,421 | 1/1971 | Streeter | 226/150 X |
| 3,721,601 | 3/1973 | Pituch et al. | 156/361 X |
| 4,019,935 | 4/1977 | Harvey | 156/361 X |

*Primary Examiner*—David A. Simmons

*Attorney, Agent, or Firm*—George E. Kersey

[57] ABSTRACT

A compact and inexpensive decorator for transferring labels by heat and pressure from a carrier strip to articles such as bottles. The decorator is designed as a unit, including infeed and outfeed conveyors, a turret for holding articles during labelling and maintaining their shape by inflation, a deck bearing a transport for the carrier web and a device for impressing labels from the strip onto the articles, and a control module. For round articles the turret includes interchangeable Index and Decorator cups, while for oval articles an easily removed turret base with article cutouts is used. The deck may be adjusted in its height and angular orientation with respect to the turret to permit decoration of a wide variety of article faces. The carrier web transport includes a capstan web drive for pulling the web, a double gate, and a dancer roll, which provide label-by-label advance of the web controlled by signals from a photoelectric web monitor and a container detector. The double gate and dancer roll are included to avoid regions of slack or high tension in the web during intermittent advance.

5 Claims, 6 Drawing Figures

APPLICATION OF INDICIA TO ARTICLES

BACKGROUND OF THE INVENTION

The present invention relates to the decoration of articles such as bottles, and more particularly to decoration of articles by means of heat transfer labelling.

Systems using heat transfer labels are widely employed to decorate bottles and similar articles. The type of which the present decorating apparatus is an example includes input and output conveyors for feeding the object to be labelled; a turret for sequentially positioning the bottles at a labelling station; and a deck which includes a feed mechanism for transporting labels supported by a carrier strip to the labelling station as well as a device for pressing the label against an adjacent bottle at the labelling station. Examples of such systems appear in U.S. Pat. Nos. 2,981,432; 3,036,624; 3,064,714; 3,208,897; 3,321,448; 3,261,734; 3,313,667; 3,709,755; and 3,861,986.

These prior art decorators are generally suitable for the user with a high volume of production, for whom the cost of the decorator is of lesser importance as compared with production rates. Such a user places relatively little emphasis on the ease with which a decorator may be adapted to articles of various shapes and sizes. These prior art decorators are not satisfactory, however, for the user with small production runs for whom machine cost and adaptability is of paramount importance. Compact design and ease of operation are also primary considerations for this user.

The label carrier webs in these prior art devices typically include a series of regularly spaced punch holes to allow the fitting of the web onto a sprocket drive roll which establishes a basic transport speed for the web. While this is a generally viable transport method, it suffers certain practical disadvantages. Suitable punching equipment represents a significant expense. The punching of the web weakens it, and requires more expensive paper for a given application than would be required without punching. In addition, driving the carrier strip at the punch holes provides less control than would be available if the entire width of the web were used. Greater control over web transport in turn allows enhanced label transfer quality.

The carrier web transport in decorating apparatus of this type advantageously includes some means for alternately accelerating and retarding the basic carrier web speed (established by the drive roll) in the area of label transfer. This is necessary to ensure that the web will be advanced essentially only during an actual transfer, thus allowing a close spacing of the labels on the carrier web. In the above prior art devices, this function was generally performed by winding the web around two shuttle rolls straddling the labelling site, which shuttle rolls were appended to a reciprocating slide. This method of intermittent web transport allows only limited control over the web advance, which may present a problem in low speed and manual decorating applications.

Commercially acceptable decorating apparatus for articles such as bottles should be adjustable to allow the placement of the transfer label at any height on the bottle surface that the user may specify. Prior art decorators allow a certain leeway in the height of the sprocket drive wheel, but this is insufficient to assure a suitable range of label locations. Such devices may therefore additionally require a raising or lowering of the turret bases for holding articles. A related problem is that of slanted bottle surfaces (such as conical surfaces). Proper label transfer onto such surfaces entails considerable design changes in the turrets of these prior art decorators (see, for example, U.S. Pat. No. 3,313,667).

Accordingly, it is a primary object of the invention to provide compact, low-cost decorating apparatus. A related object of the invention is to achieve a machine with change-over features, to allow economical utilization of such apparatus in low volume production runs.

Another object of the invention is the inclusion in the decorator of an improved carrier web transport. A related object is the elimination of need for sprocket holes in the carrier web. it is a further related object of the invention to lower costs to the user by removing the need for punching equipment and allowing the use of less expensive carrier web material. Another related object is an increased control over web transport, with commensurate improvement in label transfer quality.

It is a further object of the invention to provide intermittent web transport with improved control characteristics. A related object is the incorporation of web transport control apparatus which will be suitable for low-speed and manual decorating applications.

Yet another object of the invention is the allowance of wide variation in vertical label placement and angle of label application. It is a related object to avoid the necessity for design changes in the turret in providing such flexibility.

SUMMARY OF THE INVENTION

In accomplishing the foregoing and related objects, the decorator of the invention is a compact unit including infeed and outfeed conveyors, a turret for holding articles during labelling, and an adjustable deck bearing a carrier web transport, label preheating means, and label application means. In accordance with one aspect of the invention, different types of turrets are utilized for round and for oval articles. For round articles, the turret comprises an input gate, infeed and outfeed bottle pushers, an Index cup, and a Decorator cup, and bottle inflating means. Each cup is rotated by a drive belt. For oval articles, a continuously rotating turret base with article holding cutouts is used in conjunction with an infeed pusher. In both turret types, means are included for inflating and holding the articles. Both articles are characterized by easily interchangeable parts for adapting to a given article.

In accordance with another aspect of the invention, the label carrier web is subjected to an intermittent pull by a capstan drive which engages the entire width of the web. Prior to preheating and label transfer, the web passes through one jaw of the double gate, around a dancer roll, and through a second jaw of the double gate. Each jaw is alternately activated by the reciprocation of an air cylinder. The double gate acts in conjunction with the dancer roll to prevent undesirable web slack when the capstan is inactive or undue web tension when the capstan is active. A photoelectric detector assures a label-by-label advance of the web, while a container detector prevents web advance when no container is present in the turret.

In accordance with a further aspect of the invention, the deck is adjustably supported at two pivot points. The supporting shafts allow a raising and lowering of the deck and an angular variation with respect to the housing and turret assembly.

In accordance with yet another aspect of the invention, the capstan web drive is connected to a DC motor drive by a spline shaft and label clutch. The same motor controls the turret belt drives through a turret clutch, subject to variation introduced by a decorator control which allows stretching or shrinking of the labels.

BRIEF DESCRIPTION OF THE DRAWINGS

The above and additional aspects of the decorator of the invention are illustrated in the drawings in which.

DETAILED DESCRIPTION

Figure 1:
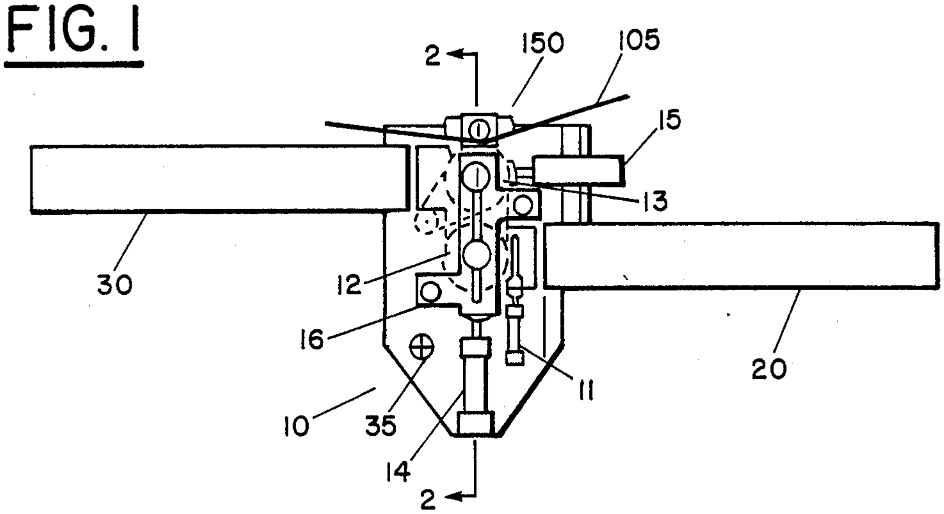
FIG. 1 is a plan view of the turret area and infeed and outfeed conveyors in an embodiment for round articles.

Reference should be had to the accompanying drawings for a detailed description of the invention. FIG. 1 depicts an embodiment of the turret and infeed and outfeed conveyors for handling round articles, illustratively bottles. The bottles are loaded automatically or by hand onto infeed conveyor 20, which comprises a moving belt with guide rails. The bottles line up against gate 11, which is a suitable restraining member activated by an air cylinder. Gate 11 opens to let a single bottle pass.

Figure 6:
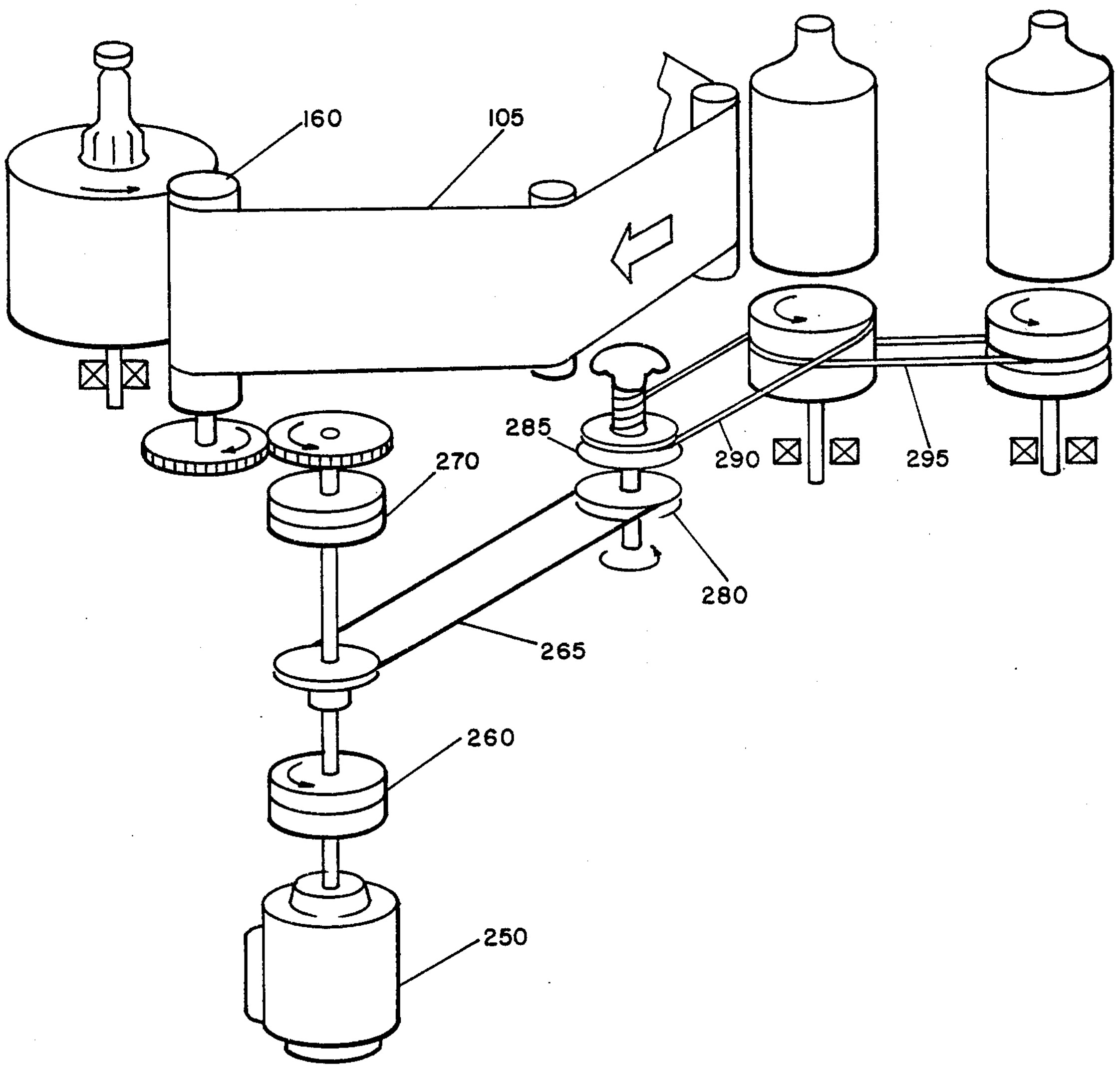
FIG. 6 is a schematic diagram of the label and turret drive system.

Turret 10 includes two bottle holding cups, an Index cup 12 and a Decorating cup 13. These cups include rims of a suitable design for holding a given bottle, and internal stripper devices (not shown) for removing the bottle from the recessed rim. The Index cup additionally includes an index pin (not shown) for rotationally positioning each bottle (the bottom of which contains an indentation for this purpose) preparatory to labelling. These cups are designed to be easily connected to and disconnected from the turret assembly. Both are rotated by belts which are driven from turret clutch 270 (see FIG. 6), and which have a pitch equal to the bottle diameter.

A bottle which has passed air gate 11 settles into the Index cup 12. During this period the bottle rotates to a desired labelling orientation. The bottle is removed from the Index cup by a stripper pin, and urged by air pusher 14 into the Decoration cup 13 where it is labelled during rotation past transfer platen 150 (see FIG. 4). The label carrier web 105 is forced into pressure contact with the bottle by an applicator roll in the transfer platen. When labelling has been completed, a stripper pin removes the bottle from the Decorator cup 13 and the bottle is pushed onto outfeed conveyor 30 by a second air pusher 15. Both air pushers consist of pusher members of appropriate shape to engage a bottle surface, placed at the end of a piston rod extending from an air cylinder.

The turret also includes a superstructure 16 which carries inflating air cylinders and nozzles (not shown) which lower into the bottle mouths. This is necessary to force air into the nonrigid bottles during labelling and thereby maintain their shape.

Figure 2:
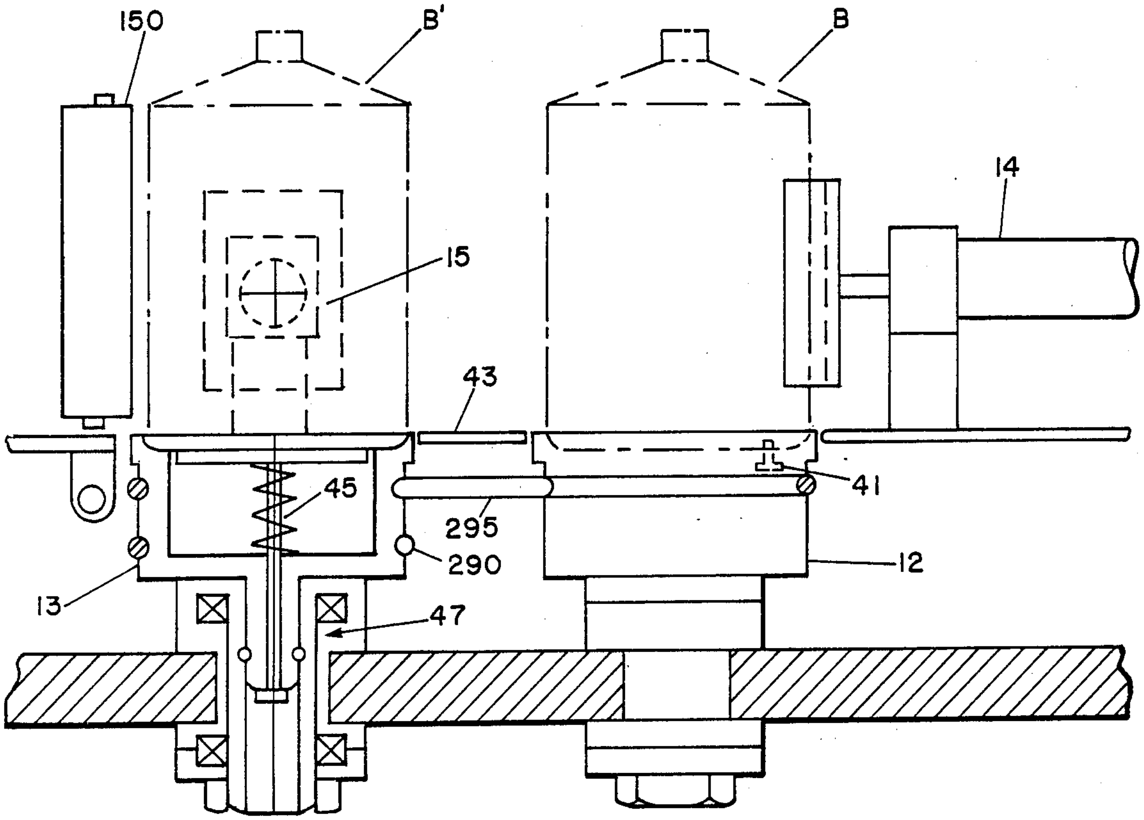
FIG. 2 is a section along the lines 2—2 in FIG. 1.

A preferred embodiment of the Index and Decorating cups of a turret for round articles is shown in the cutaway view of FIG. 2, which is a section along the lines 2—2 in FIG. 1. A bottle B in Index cup 12 rotates with the cup until index pin 41 is aligned with an indentation in the bottle's bottom. This ensures labelling of a desired portion of the bottle perimeter. Index cup 12 and Decorator cup 13 are rotated together by drive belts 290,295. Advantageous air pushers 14 and 15 are shown respectively in side and end views.

Bottle B is raised from Index cup 12 by a stripper pin which is similar to stripper pin 45 in Decoration cup 13. The bottle is pushed across dead plate 43 to position B′, where labelling occurs. Both cups are placed in a universal cup mount for easy insertion and removal. This is shown in section at 47 for the Decoration cup.

Figure 3:
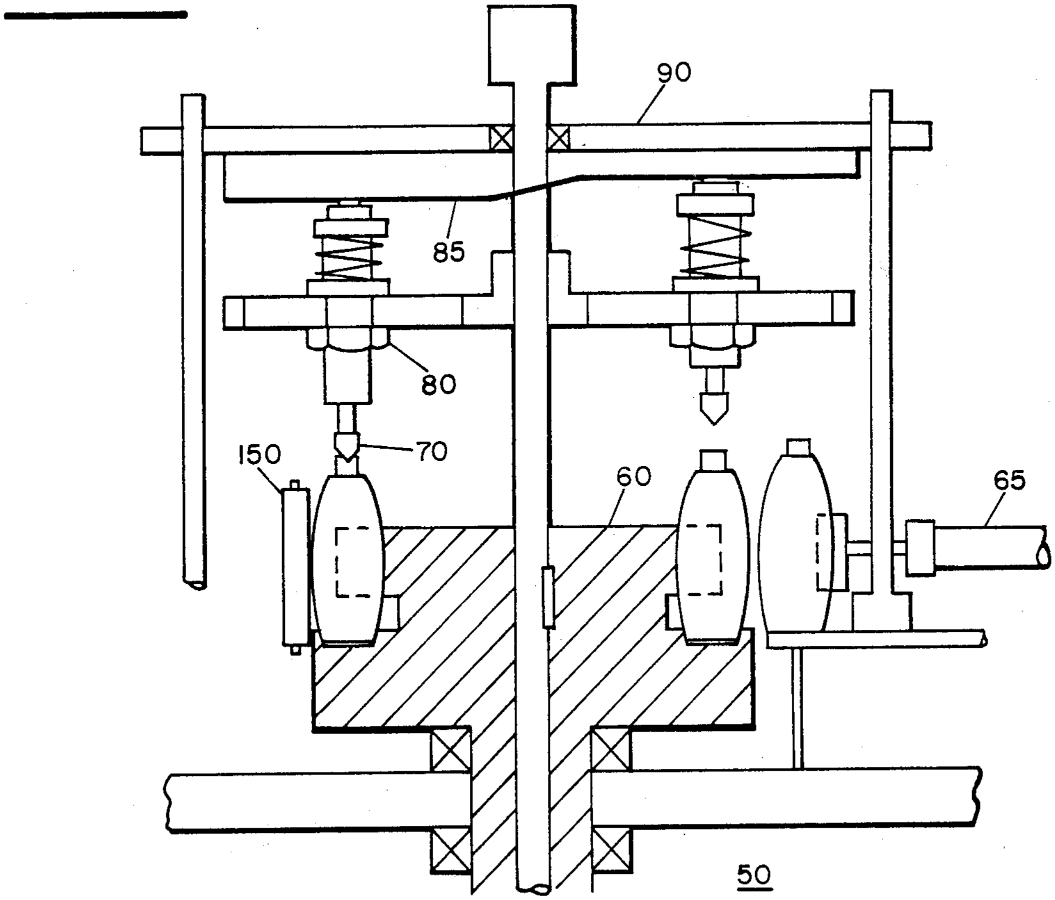
FIG. 3 is a partial elevation view of a turret for oval articles.

A turret 50 for labelling oval bottles in accordance with the invention is somewhat different in design, as can be seen with reference to FIG. 3. In place of the Index and Decorating cups, a continuously rotating turret rotor 60 is employed, with bottle holding cutouts. A bottle which has come off the input conveyor is pushed by air pusher 65 into a cutout. A nozzle 70 is lowered into the bottle to introduce inflating air and the bottle is rotated to the labelling position. The inflating nozzle is raised and lowered by means of actuating cylinder 80 which illustratively contains a compression spring (not shown), and cam surface 85 built into superstructure 90. After labelling, the bottle is removed from the turret by guide rails (not shown) on the outfeed conveyor 30. Only one drive belt is included to rotate the entire turret at the desired rate.

Both turrets include a decorating control 35 (see FIG. 1) for introducing a differential between the linear speed of rotation of the bottle to be decorated and the rate of advance of the label carrier web past the transfer platen.

Both turrets are characterized by their ready adaptability to a variety of bottle sizes and shapes. In the turret of FIGS. 1 and 2, the cups, dead plates, inflating nozzles, pusher members, and drive belts are interchangeable. In the turret of FIG. 3, the turret base, nozzles, pusher member, drive belt, and outfeed guide rails are similarly adaptable.

Figure 4:
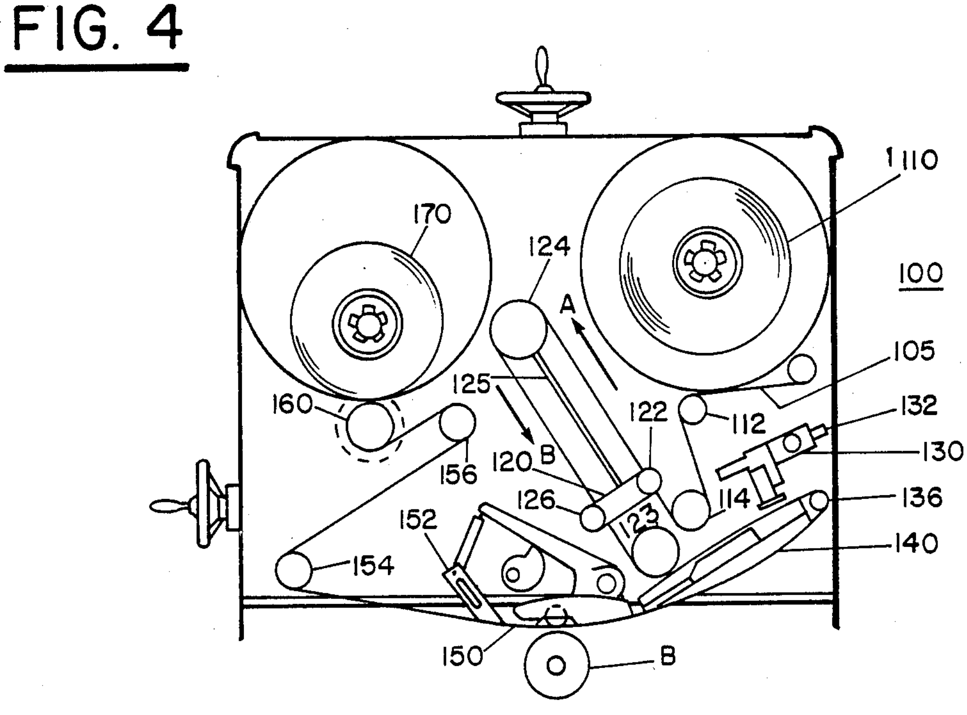
FIG. 4 is a plan view of the carrier web transport and label application areas of the invention.

FIG. 4 is a plan view of the carrier web transport and label transfer area 100. The label carrier web 105 is fed from unwind roll 110 through dancer and idler rolls 112, 114 to a jaw 122 of double gate 120. The label passes around dancer roll 124, then through a second jaw 126 of double gate 120 and around idler roll 128. At this point the web moves past a photoelectric detector 130, around roll 136, and along a preheat platen 140. After preheating, the carrier web passes between transfer platen 150 and bottle B, where label transfer occurs. At this point, all the labels are removed. Finally, the carrier web moves along adjustable guide 152 past idler rolls 154 and 156, around capstan drive 160, and is wound onto takeup roll 170.

The above web transport scheme is a mixture of conventional and novel elements. The most notable aspects are the capstan drive 160, the photoelectric detector 130, and the double gate 120. Capstan carrier web drive 160, acting on control signals generated by photoelectric detector 130 and a container detector (not shown) in the turret, intermittently advances the label web over the length of a single label during the time when the turret presents an article to be labelled. This control is effected by means of a label clutch which connects the capstan with main drive motor (see FIG. 6). The container detector (not shown) in the turret assembly prevents the advance of the web when no article is presented for labelling. The use of a capstan drive for carrier web advance provides a precise control over web tension in acting on the label carrier web over its entire width.

Photoelectric detector 130 scans carrier web 105 in the area bearing labels, and is sufficiently sensitive to register the presence or absence of a transfer label. Detector 130 is mounted in a linear slot 132 for the purpose of adjustment in the event of a change in label size. Detector 130 provides means for regulating the advance of the label carrier web, label by label. This is a preferred method for monitoring the amount of carrier web advance, but other detection means may be employed. No punching of the web, nor printing of registration marks, is required.

The use of a capstan drive to provide an intermittent pull on the carrier web requires some means of controlling web advance in other segments of the web transport, so that regions of unmanageable slack and regions of undesirably high web tension will be avoided during this start and stop process. This is accomplished by dancer roll 124 and double gate 120. Double gate 120 comprises a pair of jaws (the locations of which are shown at 122 and 126) which are alternatively activated according to the position of an internal air cylinder (not shown). Dancer roll 124 is mounted in a long slot 125, and is pneumatically subjected to a force in direction A. The position of the air cylinder within double gate 120 is electronically regulated by signals from photoelectric detector 130 and the container detector (not shown).

When a signal from the container detector indicates that a container is moving into labelling position, label clutch 170 activates capstan drive 160 and causes jaw 126 to open while jaw 122 closes. At this point, dancer roll 124 is in the extreme outer position in direction A, providing a stored surplus of carrier web approximately equal to twice the length of slot 125. The capstan label drive 160 pulls a quantity of carrier web at a prescribed tension out of this stored surplus, causing dancer roll 124 to move in direction B. This occurs because the tensioning force of the label drive is greater than the countervailing pneumatic pull in direction A on dancer roll 124. Photoelectric detector 130 has been calibrated to register the advance of one label's length. When label drive 160 has pulled carrier web 105 to this extent, detector 130 electronically causes label drive 160 to cease its pull, and simultaneously causes jaw 126 to close while jaw 122 opens. During this interim between labelling periods, the dancer roll 124 moves in direction A back to its extreme outer positions, pulling a quantity of carrier web off unwind roll 110. The method of intermittently advancing the carrier web allows the transfer of labels which are considerably longer than those permitted by prior art decorators. In avoiding a reciprocating web motion in the labelling area, this transport ensures an even preheating of the transfer labels.

Figure 5:
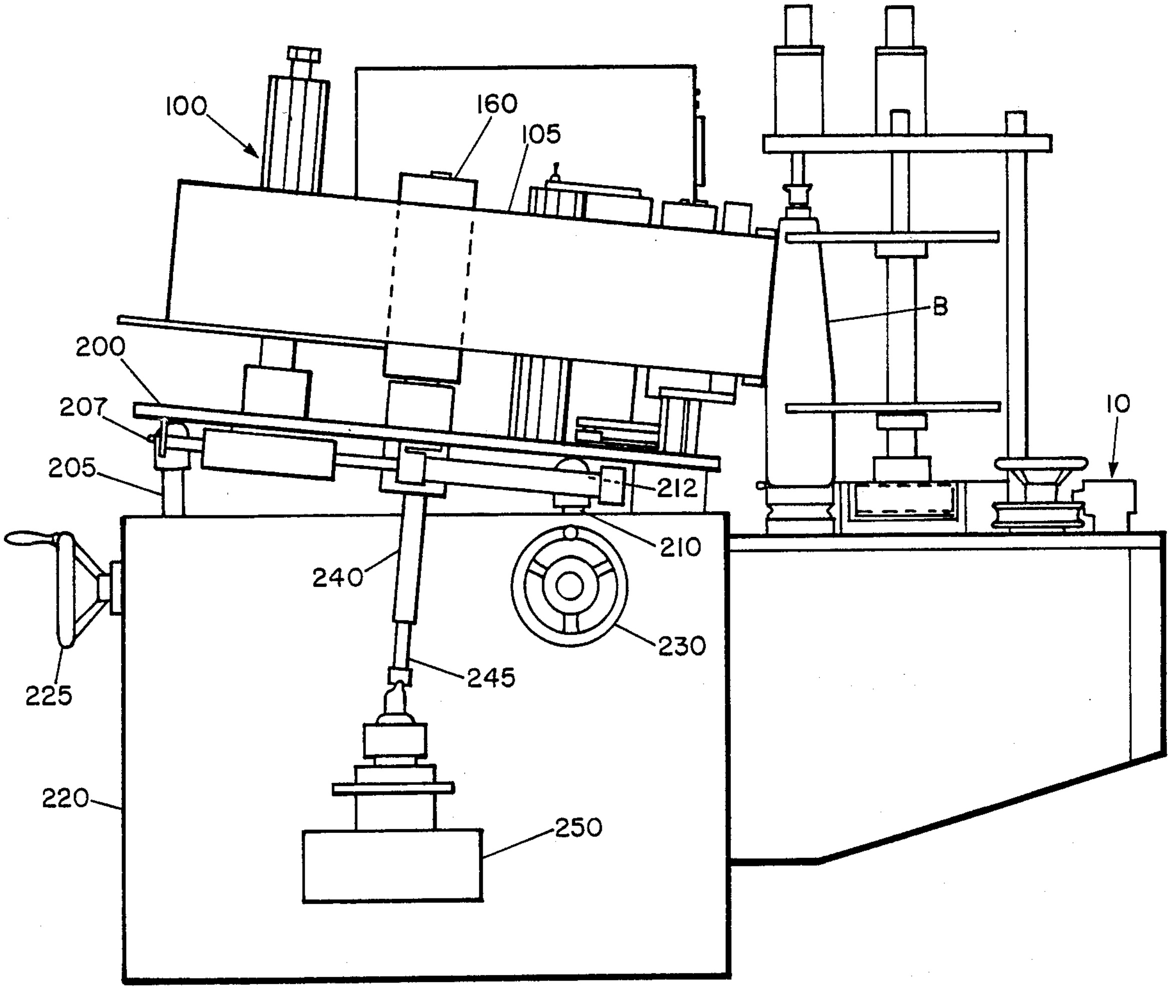
FIG. 5 is an elevation view of the carrier web transport housing and attached turret assembly.

FIG. 5 is an elevation view of the deck area of the decorator. This label transport 100 is mounted on an adjustable top plate 200. Top plate 200 is connected to supporting shafts 205 and 210 at pivotal connections 207 and 212. Shafts 205 and 210 are mounted in housing 220 in such a manner that they may be raised or lowered by turning hand wheels 225 and 230. This allows an adjustment of the height of the web 105 with respect to the turret 10 and additionally permits an angular alignment of the web with respect to an article B presenting a slanted face to be labelled. Illustratively, the deck may be angled as much as 15° above or below the horizontal orientation.

Capstan 160 is mounted through plate 200 onto a shaft 240, which advantageously has a splined connection with a shaft 245 driven from DC motor 250, thus allowing a telescoping coupling for the label drive. DC motor 250 drives shaft 245 by way of a label clutch (not shown). This is shown more fully in the schematic view of FIG. 6, an embodiment for round articles. Main drive motor 250 has a dual connection to turret clutch 260 and label clutch 270. Label clutch 270 is connected to capstan label drive 160. Turret clutch 260 is linked by belt 265 to variable speed connection 280, which in turn controls the rotation of Decorating cup 13 and Index cup 12 by means of connecting belts 290 and 295. Variable speed connection 280 comprises a variable drive pulley 285, the action of which is controlled by a decorator control wheel 35 on the turret assembly (see FIG. 1). This may be used to introduce a differential between the linear speed of article rotation and the speed of label advance, controlled by capstan 160. Such a differential has the effect of stretching or shrinking the heat transfer label as it is applied to the article surface, which may be used to produce desired decorating effects, as is well known to skilled practitioners of the art.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

We claim:

1. In a device for transferring labels from a carrier web to articles comprising a turret for rotating the articles past a site of label transfer and a carrier web transport for directing the carrier web along a prescribed route at a desired speed, which prescribed route includes the site of label transfer, an improved carrier web transport comprising:

web dispensing and collecting means;

a capstan web drive near the web collecting means for pulling the carrier web through the prescribed route during a period of label transfer, which capstan web drive exerts no pull on the web during interim periods between the periods of label transfer;

a dancer roll which is movable in a slot and is subjected to a force toward one end of the slot, which force is less than the pull exerted in the opposite direction by the capstan web drive during periods of label transfer; and a double gate at the other end of said slot including first and second jaws which alternately clamp the carrier web, the first jaw only during periods of label transfer and the second jaw only during interim periods;

wherein said prescribed route comprises respectively the web dispensing means, the first jaw, the dancer roll, the second jaw, the site of label transfer, the capstan web drive, and the web collecting means;

whereby the double gate and dancer roll collect a carrier web surplus from said web dispensing means during interim periods and release this surplus past the labelling site under the influence of the capstan web drive during periods of label transfer.

2. The device for transferring labels of claim 1 further comprising article monitoring means in said turret for activating the capstan web drive and opening the second jaw when said article monitoring means detects an article to be labelled.

3. The device for transferring labels of claim 1 further comprising web monitoring means for deactivating the capstan web drive and closing the second jaw when said web monitoring means detects an index of web advance.

4. The device for transferring labels of claim 3 wherein said web monitoring means comprises a photoelectric detector which is trained on the label-bearing portion of the carrier web and detects the presence or absence of a label.

5. The device for transferring labels of claim 1 wherein said double gate comprises a reciprocating air cylinder with first and second positions, wherein the first position closes the first jaw and opens the second jaw, while the second position closes the second jaw and opens the first jaw.

* * * * *